United States Patent
Agness et al.

(10) Patent No.: US 6,799,052 B2
(45) Date of Patent: Sep. 28, 2004

(54) HAND-HELD CELLULAR TELEPHONE SYSTEM WITH LOCATION TRANSMISSION INHIBIT

(76) Inventors: Michael K. Agness, 14 Pine St., Kearny, NJ (US) 07032; John M. Allegrezza, 15-3 Potters Pl., Holland, PA (US) 18966; John J. Simkanich, 122 Chesapeake Dr., Newtown, PA (US) 18940

( * ) Notice: Subject to any disclaimer, the term of this patent is extended or adjusted under 35 U.S.C. 154(b) by 533 days.

(21) Appl. No.: 09/779,386

(22) Filed: Feb. 8, 2001

(65) Prior Publication Data

US 2002/0107032 A1 Aug. 8, 2002

(51) Int. Cl.$^7$ ................................................ H04Q 7/20
(52) U.S. Cl. ................................ 455/456.4; 455/456.1; 455/456.5; 455/565; 455/569.1; 455/414.1
(58) Field of Search ................ 455/414.1, 456.1–456.6, 455/457, 432, 433, 418, 419, 420, 521, 404.1, 404.2, 565, 569, 569.1

(56) References Cited

U.S. PATENT DOCUMENTS

| | | | | |
|---|---|---|---|---|
| 5,442,805 A | * | 8/1995 | Sagers et al. | 455/456.1 |
| 5,940,764 A | * | 8/1999 | Mikami | 455/456.1 |
| 6,011,973 A | * | 1/2000 | Valentine et al. | 455/456.1 |
| 6,038,445 A | * | 3/2000 | Alperovich et al. | 455/422 |
| 6,108,563 A | * | 8/2000 | Shishino | 455/560 |
| 6,201,973 B1 | * | 3/2001 | Kowaguchi | 455/456.1 |
| 6,389,288 B1 | * | 5/2002 | Kuwahara et al. | 455/456.1 |
| 6,421,544 B1 | * | 7/2002 | Sawada | 455/565 |

* cited by examiner

Primary Examiner—Duc M. Nguyen

(57) ABSTRACT

A digital cellular telephone circuit contains a GPS (Global Positioning System) location circuit, which generates a location code indication signal transmitted to a cellular signal processing station communication server at a local cell base station, when a transmission (telephone call) is placed or received by a cellular user. A program on the server interrogates appropriate ones of various stored databases which contain location information for cell transmission inhibit. Monitoring and control software in the communications server compares the cellular telephone's GPS location against the stored databases of transmission inhibit locations. Such inhibit locations may include GPS highways locations, restricted commerce GPS locations, restricted activity selection, and others. If location or activity transmission inhibit data is found, the control software looks for the presence of an override signal bit. A rejection tone or message may be sent when calls are rejected. If the cellular telephone has been connected in an override state as a result of a special predetermined condition, i.e., a hands-free communication, or a "911" emergency call or medical alert is being placed, the cellular unit transmits an indicator signal which causes a by-pass of the inhibit function.

8 Claims, 7 Drawing Sheets

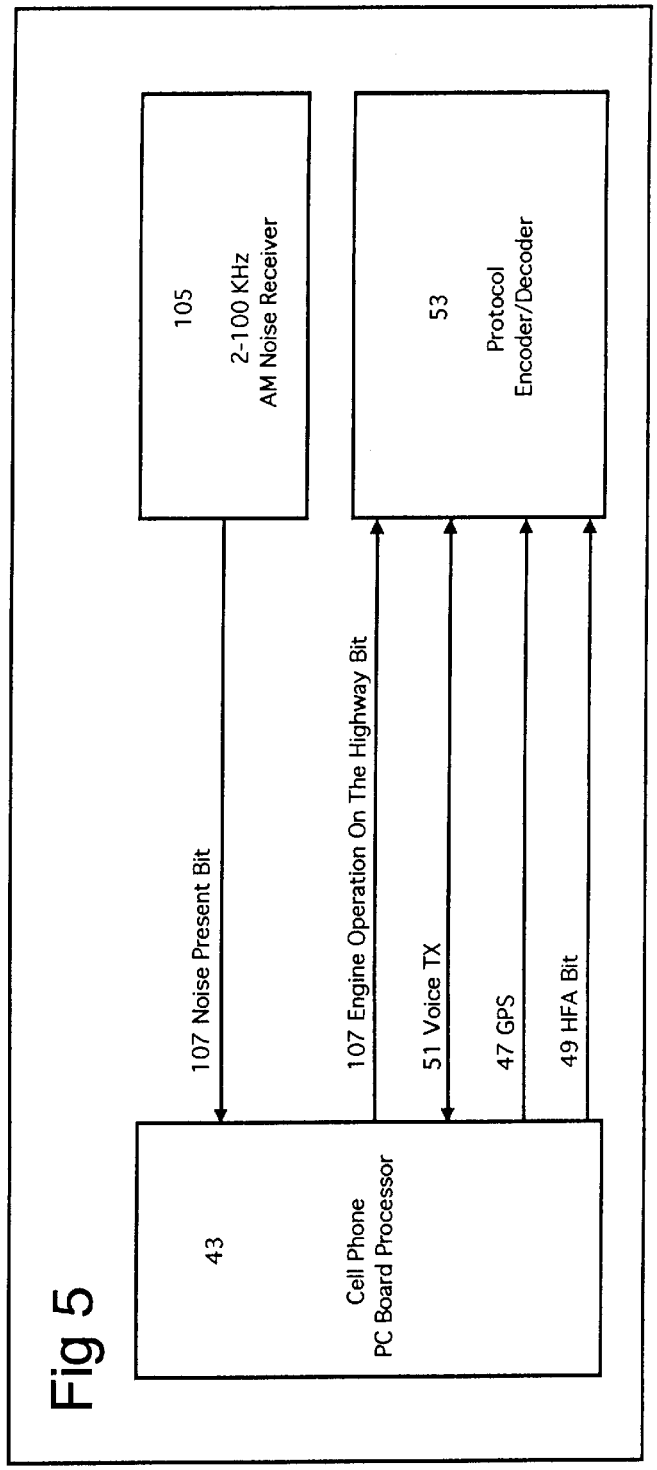

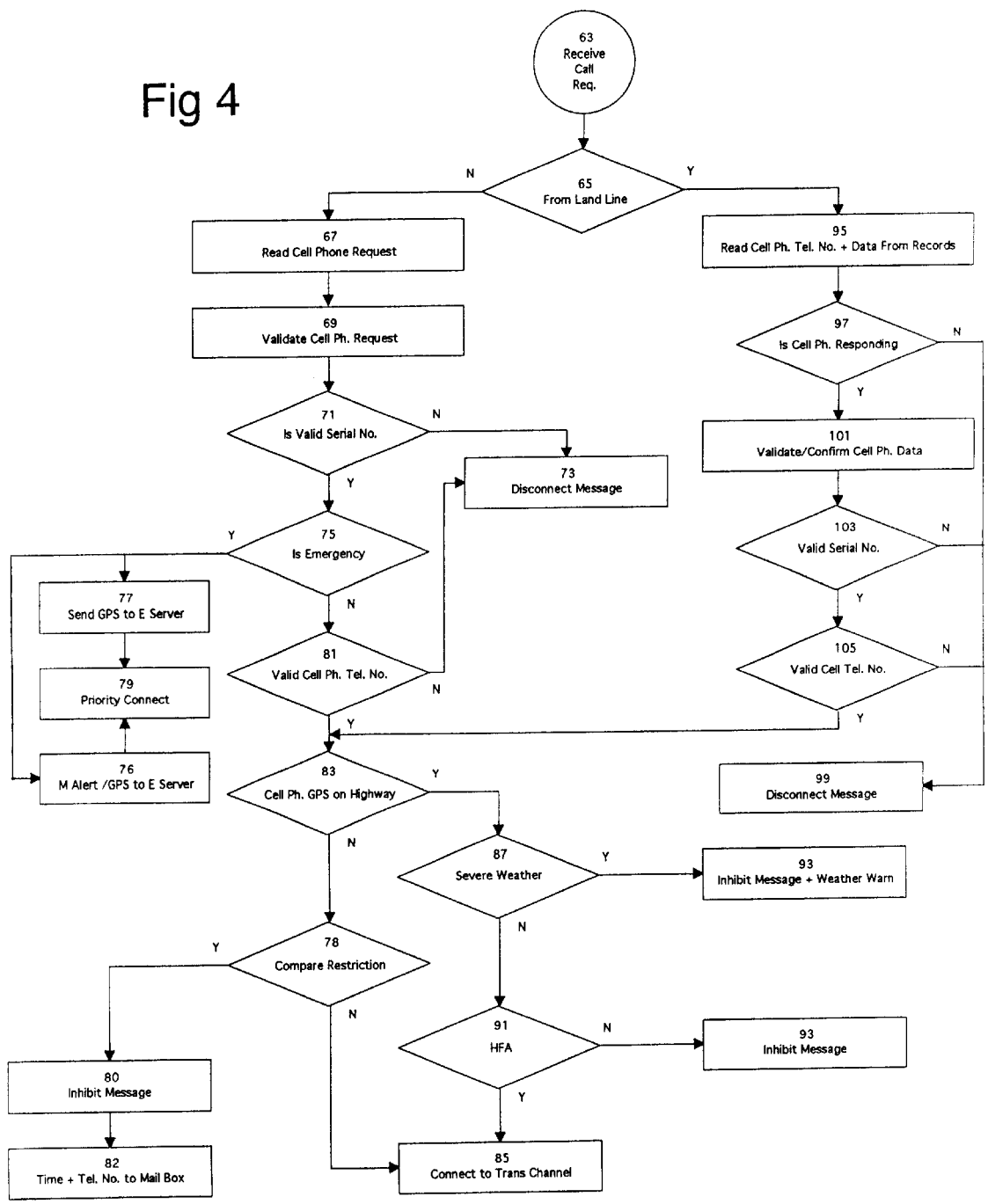

HAND-HELD CELLULAR TELEPHONE SYSTEM WITH LOCATION TRANSMISSION INHIBIT

BACKGROUND OF THE INVENTION

The present invention is directed to an improvement to an existing cellular telephone system, which improvement has a monitoring and control circuit which inhibits the transmission of cell phone communications when the cell phone user is on a highway, in a restricted location such as a hospital treatment room, a court room and the like, or in a user pre-registered location.

The invention is further directed to a monitoring and control circuit which detects permissible highway cell phone use under hands-free operation, but which may also inhibit cell phone use under severe driving conditions even with hands-free operation.

Modern cellular telephones (cell phones) are so small and portable that users can carry them in their pockets and use them anywhere, even while operating a motor vehicle.

Studies by the National Highway Traffic Safety Administration (NHTSA) of the United States Department of Transportation have shown that automotive driver attention is distracted when holding and using a cell phone. It is estimated that as many as 40 percent of the drivers presently use cell phones while driving. The Network of Employers for Traffic Safety reported to the NHTSA estimates of between 4000 and 8000 traffic accidents per day caused by distracted drivers. The *New England Journal of Medicine* has reported a study which found that cell phone use while driving quadrupled the risk of an accident and was almost as dangerous as being drunk behind the wheel.

Municipalities are beginning to enact anti-cell phone driving ordinances. Several states are considering passing anti-cell phone driving motor vehicle laws. Certain civil rights activists are pressing for individual freedoms to continue motor vehicle cell phone use. It is anticipated that many years may pass before the issues involved with anti-cell phone motor vehicle laws are settled. Even with laws in place, the ability of police enforcement will always be a concern.

Modern digital cellular telephones (cell phones) can contain Global Positioning System (GPS) circuitry imbedded on the basic circuit board. This GPS circuitry determines the latitude and longitude location of the cell phone circuitry, from navigation system signals received from a satellite system developed as part of the United States Department of Defense NAVSTAR program. This GPS location information which can be available to digital cell phone transmission circuitry has in the past, because of government restrictions on the NAVSTAR satellite system, had a locating accuracy in excess of 20 feet.

Various databases for roadway locations are available from such sources as Rand McNally Company, Microsoft Inc., and others. These databases contain the location description of each roadway in the United States by latitude and longitude.

The U.S. Weather Service and regional weather centers make severe weather information available to the public according to GPS locations.

Additionally, restricted wireless commerce locations exist where cellular phone operation is prohibited. These include transportation equipment with highly sensitive equipment, i.e. air planes and super-speed trains, court rooms, religious services, hospital treatment rooms, prison cells and penitentiary grounds, high risk manufacturing locations, and the like. A cell user may also select to have his calls inhibited on a time delegated basis, such as from 12 midnight to 6 am.

Further, each cell phone can be programmed to place a predetermined medical alert call, such as those placed by present personally worn medical alert systems. This medical alert transmission would include a coded "help" message and the GPS location of the cell phone user.

It is desirable, therefore, to address cellular phone use from a scientific approach. This includes for each intended cellular transmission the determination of restricted activity or restricted location on a time and/or GPS location basis. With proper cell phone blocker equipment, automobile insurance companies and other industries would be free to grant vehicle insurance premium reductions, workman compensation insurance reductions, just as they now do with auto alarm systems, auto air bags, building fire and theft detection systems and other such safety systems.

It is secondly desirable to utilize digital cell phone GPS information, roadway GPS information and weather information to inhibit the ability to make cell phone calls while on a roadway in severe weather.

It is also desirable to inhibit telephone transmission at the local communications server with cell phones being used on the roadway in the absence of a hands-free operation, and at other predetermined restricted locations or at predetermined restricted times.

It is further desirable to incorporate monitoring and control circuitry into each cell tower communications server to compare cell phone GPS location with roadway location information when a cell phone call is being made.

It is also further desirable to incorporate a hands-free operation indicator signal which will permit cell phone transmission while on the highway in the absence of severe weather information.

The purpose of the present invention, therefore, is to provide a transmission inhibit for digital hand-held cell phones when at specified highway locations and specified other restricted locations or during specified restricted times.

SUMMARY OF THE INVENTION

The objectives of the present invention are realized in an improvement to a cellular telephone system, which incorporates a transmission inhibit system for cell phones being used at specific highway locations and at other specific restricted locations or at elected locations. The restricted locations include those where electric transmissions create a safety hazard, or where cell phone use is prohibited. Such locations may include hospitals, court rooms, penitentiaries, manufacturing locations, religious services, and the like.

A high resolution global positioning system (GPS) circuit is incorporated into a cell phone unit to provide high definition GPS location information. The accuracy of the information provided by this GPS circuit is to within 10 feet or less of actual position.

Each cell phone control signal header is configured to include this GPS location information and other information, including an indicator of the use of a hands-free adaptor (HFA). Each cell base station communications server includes monitoring and control software (MCS). When a cell communications server processes a request for a call, the MCS intercepts the cell phone control signal header information, and analyses it for cell phone condition, GPS location, HFA indicator signal bit presence, "911"

emergency priority status, medical alert status, restricted time status, and the priority of the transmission processing for the call.

Emergency calls, i.e. "911" calls and medical alert calls are connected directly to the transmission channel after a valid cell phone serial number is detected.

For all other calls, the cell phone reported GPS location is compared against each of the stored databases for highway location codes, other restricted location codes, restricted time codes, and elected location codes. When the GPS location of the cell phone is a highway location the HFA indicator bit is searched.

A cell phone call place to or from an on-the-highway location, or with another location in a restricted data base, is rejected and an inhibit message is broadcast before disconnect. Incoming rejected calls can be stored in a temporary "mail box" for each cell phone by telephone number, time and date. Mail boxes are callable from the cell phone. The size of the mail box is determined by a cellular user.

Weather Bureau severe weather reports are compared against the reported GPS location. If the cell phone is determined to be in HFA operation but in a severe weather region, the cell call may be inhibited and a severe weather warning is broadcast.

The monitoring and control circuitry operates on monitoring and control software (MCS) at the cell station communications server location. The system may be configured with one main server and (MCS) location, implemented with a server bank of identical units for increasingly heavier demand. Or the system may be configured as needed with regional servers having regionally positioned monitoring and control circuitry and MCS. When regional servers are employed, the various databases are cached regionally with central or national archiving. Each database storage unit can contain its own control software to reorganize its priority levels of stored information as a function of percentage of use.

A hybrid database storage system will also work. Here data requests are routed to a central storage location which contains duplicate servers to handle increased demand. Frequently requested data many be duplicated and distributed to regional storage. A request for data first looks locally and then nationally for data.

The MCS can be implemented in software compatible with the hardware in which it resides. C language and C++ language are common implementations. The MCS connects all valid calls which are not from on-the-highway locations, or which are from such highway locations, but from HFA units and without severe weather issues.

Each cell phone's microprocessor may be connected to a hands free adaptor (HFA) to receive voice activated preprogrammed dial (VA PPD) information and to activate and deactivate the cell phone operation at preprogrammed voice commands.

A microprocessor driven high resolution GPS circuit is mounted in the cell phone and uses the same antenna as the cell phone telephone transmission circuit. The cell phone microprocessor is programmed to operate from the HFA and to provide a HFA indicator bit. This information, as well as GPS information, is processed by the cell phone protocol encoder/decoder communications processor. A cellular digital packet data (CDPD) modem interfaces the cell unit's communications processor and its transmitter/receiver.

Cell towers which service restricted areas such as prisons and manufacturing facilities may have their controllers programmed to inhibit all transmissions with cell phones which do not provide GPS location information, or inhibit all transmissions with cell phones whose telephone number is not approved, such as the prison warden and the manufacturing executive officer, whose calls would not be inhibited.

DESCRIPTION OF THE DRAWINGS

The features, advantages and operation of the present invention will become readily apparent and further understood from a reading of the following detailed description with the accompanying drawings, in which like numerals refer to like elements, and in which:

FIG. 3 is a block diagram of the cell phone control signal header information utilized by the present inhibit invention; and FIG. 4 is a logic flow diagram for the monitoring and control software resident within a general process computer comprising the cell base station monitor and control computer of FIG. 2a.

FIG. 5 is a circuit block diagram for an on-the-highway detection system;

DETAILED DESCRIPTION OF THE INVENTION

The present invention is a monitoring and control system for inhibiting transmissions with hand-held digital cellular telephones (cell phones) when such cell phones are at any of various predetermined inhibit locations, such as "on-highway" locations. Such monitoring and control system will pass emergency "911", medical alert and other emergency and priority calls. The system can be selected to pass calls (transmissions) with cell phones at on-highway locations when such cell phones are in hands-free operation.

Figure 1:
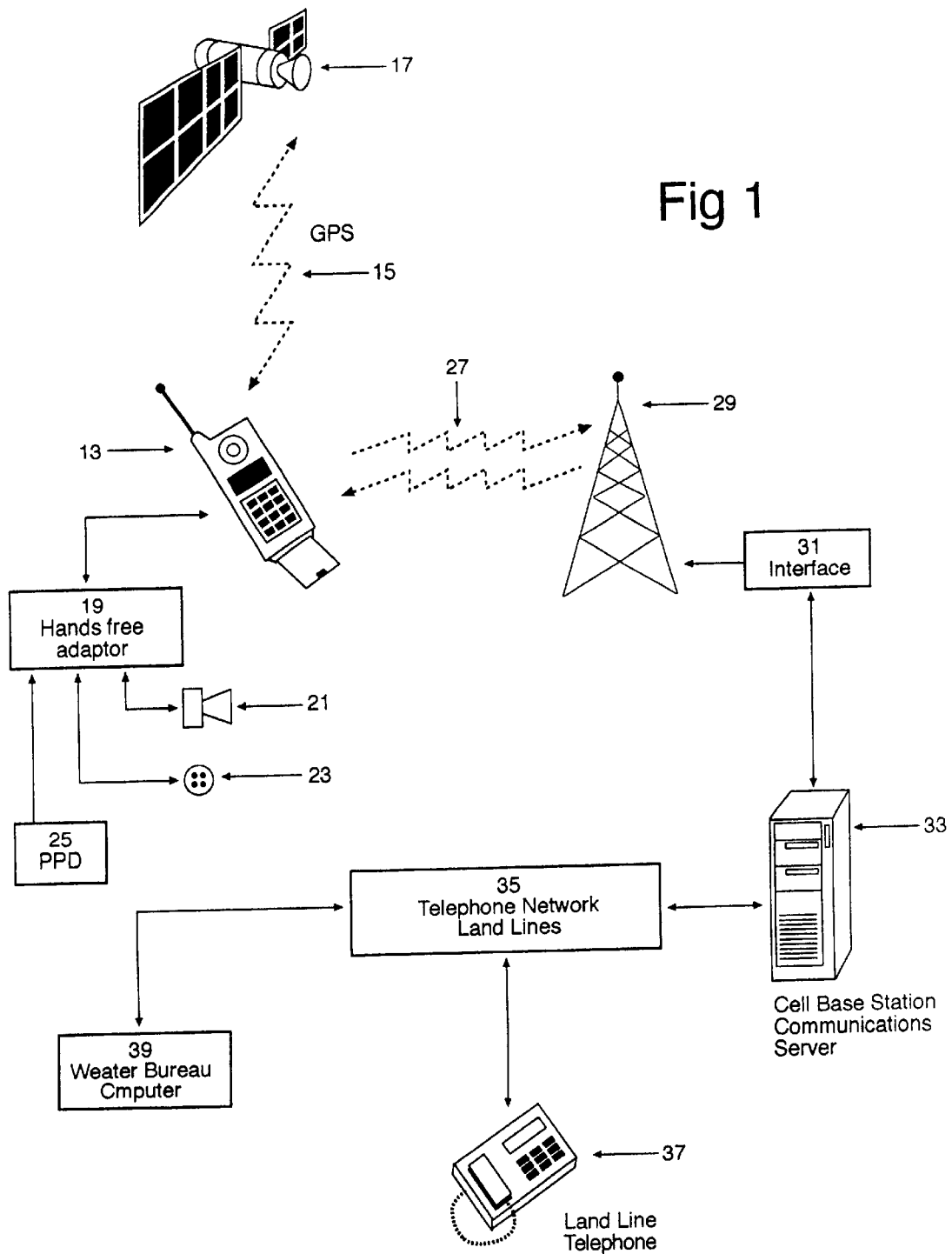
FIG. 1 is a system block diagram which shows the highway location inhibit circuitry for digital hand-held cell phones.

The monitoring and control system 11, FIG. 1, has each cell phone 13 receive GPS information 15 from a navigational satellite system 17, such as the United States Defense Department NAVSTAR system which provides civilian global positioning signals for navigational and position locating purposes.

When installed in a motor vehicle, each cell phone 13 is required to be connected to a hands-free adaptor (HFA) 19 for operation. Each HFA 19 has connected to it a speaker 21 and a microphone 23. A preprogrammed dialer circuit (PPD) 25 is also connected into the HFA 19.

This hands-free operation is commercially available from cell phone suppliers such as Qualcom, Nokia, Motorola, and others. It permits preprogrammed voice activation and operation (dialing) of a cell phone to which the HFA 19 is connected.

Each cell phone 13 communicates 27 with a local cell tower 29 on assigned frequencies, such as presently assigned between 800 MHZ and 900 MHz, or other frequencies assigned by the Federal Communications Commission (FCC). The United States systems uses a control channel and a transmission channel. The control channel is used to hail a base station communications server and establish a transmission with a particular cell phone unit. Communications are conducted on the transmission channel.

The cell tower 29 is connected to an interface unit 31. This interface unit 31 contains transceiver (transmitter/receiver) circuitry, digital signal processor (DSP) modem, noise filters, signal amplifiers and time division multi-access (TDMA) and code division multi-access (CDMA) processing circuitry.

A cell base station communications server 33 controls the link between its associated cell tower 29 transmitter/receiver (transceiver) transmission channel operation and the public telephone land lines 35. Typically, but not necessarily, a cell tower communications server 33 is located at an individual mobile station, and sometimes at the master switching center, which is known as a mobile transport serving office (MTSO). An MTSO links between users in different cells, and between land line telephones 37. It acts as the gateway to the PSTN (public switched telephone network), i.e. that controlling the network land lines 35.

The United States National Weather Bureau computer 39 database is connected to the PSTN for accessing regional weather and severe weather locations.

By dividing a service area into small cells that have limited-range transceivers, each cell system can reuse the same frequencies many times. The master switching center (MTSO) operates similarly to a telephone central office and provides links to other offices and individual mobile stations. Each base station supports a specific number of simultaneous calls, sometimes from 3–15 transmissions, and at others, up to 45 simultaneous transmissions, depending upon the underlying technology (CDMA, TDMA, or derivatives).

Most cellular systems provide two types of channels: a control channel and a traffic (transmission) channel. A base station and a mobile station use the control channel to support incoming and outgoing calls, to monitor signal quality, and to register when a user moves into a new zone. The traffic (transmission) channel is used only when the station is off-the-hook and is actually involved in a call.

Control and traffic channels are divided into time slots. When the user initiates access to the control channel to place a call, the respective local mobile station randomly assigns a time slot to the traffic channel. For an incoming call to a mobile station, the base station initiates conversations on the control channel, addressing the mobile station in a time slot which time is reserved for the station reply. When two user's call attempts collide, each are assigned another sub-slot and try again. Repeated rejections are recognized as service being full and additional incoming and outgoing service call requests are rejected.

The master switching center (MTSO), through an element of the user-to-base station connection, monitors the quality of call signals and transfers the call to another base station when the signal quality reaches an unacceptable level due to the distance traveled by the user, obstructions, and/or interference.

Figure 2:
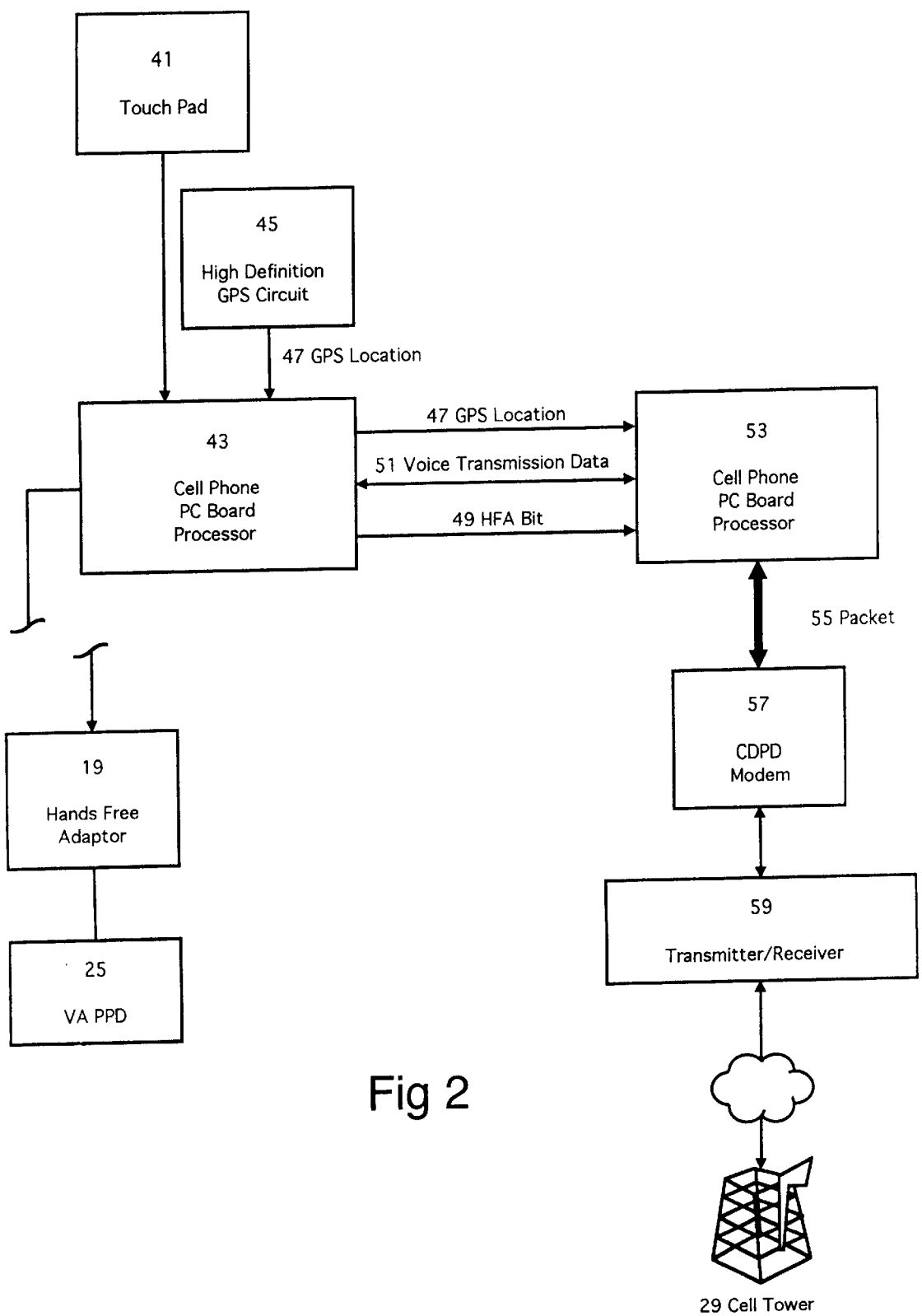
FIG. 2 is a circuit block diagram of the circuitry within a cell unit used to implement the present inhibit invention.

Each cell phone 13, includes a keypad (also called a touch pad) 41, FIG. 2. This keypad (touch pad) 41 is connected to provide inputs to the main microprocessor 43 on the cell phone printed circuit (PC) board. Also connected to the main microprocessor 43 is the hands-free adaptor (HFA) 19, which carries with it a voice activated (VA) preprogrammed dialer (PPD) unit 25.

Rather than initiating a call by first obtaining a dial tone from the network switching system, as is done with the land line network, a user enters the dialed number into the unit through the VA PPD 25 and HFA 19. The user then voice initiates a "send" function. Once the network has process the call request, the user will hear conventional call-process signals, such as busy or ringing. To disconnect, an "end" function is voice activate.

Logic and control functions are programmed into the main microprocessor, which includes the Numeric Assignment Module (NAM). The NAM is used for programmable assignment of the unit's telephone number by the service provider and the electronic serial number (ESN) of the unit. Electronic serial numbers are unique to each unit. Typically, the ESN is burned into an EPROM or PROM connected to the main microprocessor 43.

When a unit is in service, the cellular network interrogates the cell phone for both of these numbers in order to validate that the calling/called cell phone is a valid subscriber. The logic/control component of the units's microprocessor interacts with the cellular network protocols. These protocols determine what control channel the unit should monitor for paging signals and what voice channels the unit should utilize for a specific connection. This logic/control component of the unit's microprocessor also monitors the control signals of cell sites so that the unit and the network can coordinate transitions to adjacent cells.

A high definition (resolution) global positioning system (GPS) circuit 45 is connected to the main microprocessor 43 to provide GPS location information (i.e, position data) 47 to the microprocessor 43. This GPS location data 47 is sent to the network cell station through the unit's main microprocessor 43 along with a HFA bit 49 and the unit's preprogrammed logic/control information and other transmission request data. During a call, the main microprocessor also processes the voice transmission digitized data 51.

A protocol encoder/decoder communications processor 53 translates the information sent from the cell phone unit and received by the cell phone unit with the proper protocols of the cell system operation. Digitized packet data 55 is exchanged bi-directionally with a cellular digital packet data (CDPD) modem 57. This CDPD modem 57 is connected to the unit's transceiver (transmitter/receiver) 59. The transceiver 59 and the high resolution GPS detector circuit 45 are each connected to the unit's antenna (not shown). The transmitter/receiver 59 communicates with a local cell tower 29 through this antenna.

To be accurate for normal on-the-highway positioning, the GPS locationing circuit 45 should provide an accuracy within about 10 feet. Signal accuracy to five (5) decimal places would provide accuracy of approximately three (3) feet. Accuracy of plus or minus 0.00002 degrees (longitude and latitude) would provide an accuracy of about seven (7) feet. NAVSTAR provides such accurate signals, however they are not yet made available for civilian uses because of NAVSTAR's selective ability (SA) encryption. The NAVSTAR GPS signals available for civilian uses have been partially encrypted to provide an accuracy of about a 20 to 60 foot radius. This error (accuracy) is not acceptable for the present invention.

The high resolution GPS circuit 45, therefore contains a WAAS (wide-area augmentation system) circuit such as available in the marketplace from Raytheon Systems, Inc, Lexington, Mass. This circuit provides WAAS differential GPS service. WAAS utilizes ground stations that compare satellite GPS signal position readouts to each station's known position. The ground stations provide a differential correction signal as a function of location from each ground station.

The main microprocessor 43 may be implemented by any suitable, commercially available, microprocessor unit. An example is a Net+Arm Technology, Inc. model 12, which is a 32 bit microprocessor running nominally at 25 MHz, with adjustments in the range 12–36.8 MHz. C family programming languages may be used. The protocol encoder/decoder 53 may be implemented with a similar microprocessor, or an Intel Corporation, Pentium® I, or higher running Microsoft Corporation, WINDOWS C/E®. It can also be implemented in an Intel Corporation, Pentium® RTM based microprocessor using Microsoft Corporation RTM operating system for Microsoft Corporation Windows® RTM 95.

It may also be implemented in a communications commercially available Altera Corporation, field programmable gate array, using AHLDL (Altera High Level Design Language) in hexadecimal code.

The CDPD modem 57 is available in the marketplace for various vendors, including Rockwell International, Inc., Motorola Corp, and Ambient Inc.

A unit of transmission in ATM (asynchronous transfer mode) and in SMDS (switched multi-megabit data services operation), is the cell packet. The fixed-size cell packet is 53 octets (bytes) long. A packet header read and operated upon by the monitoring and control transmission inhibit circuitry of the is invention precedes the initiation of the communication transmission data.

Figure 2A:
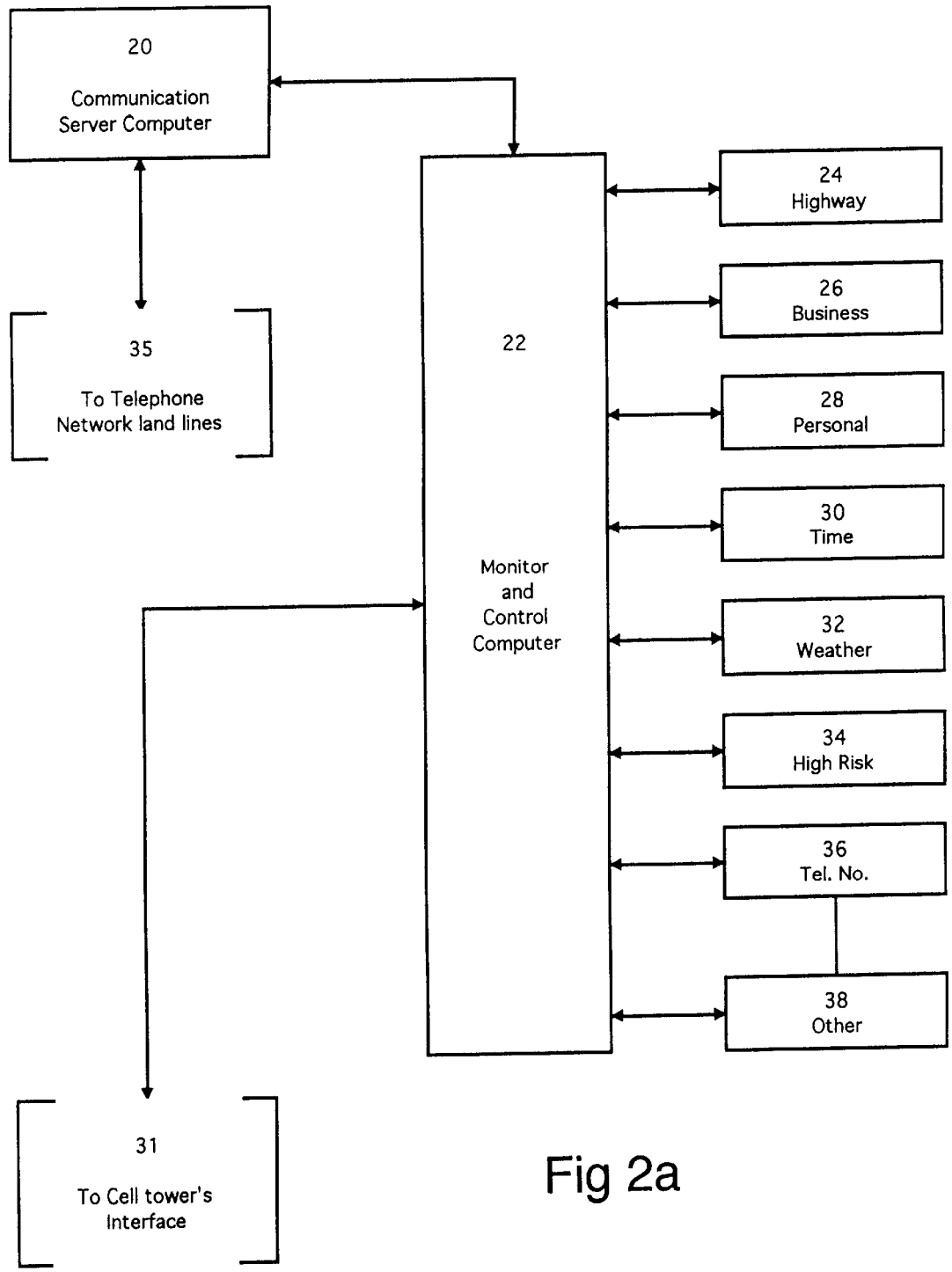
FIG. 2a is a circuit block diagram of the circuitry within a cell base station communications server 33, showing a monitor and control computer and the various data base storage devices connected thereto.

Within each cell base station communications server 33 is a communication server processor computer 20, FIG. 2a. This computer 20, which performs call routing, is implemented with any of the processors identified above or any other computer used by local telephone or cell providers in the marketplace. A dedicated monitor and control computer 22 is connected for two-way communications with the communication server computer 20. This monitor and control computer 22 is likewise connected for two-way communications with each cell tower 31 served by the station. Again, implementation of this monitor and control computer may be with any of the computers identified previously, or substitutes or replacements for them.

The monitor and control computer 22 accesses a plurality of separate databases specific to the service area of the base station. Each database is held in a dedicated storage space such a hard drive. Shown connected to the computer 22 are restricted transmission data for GPS: highway locations 24; business locations 26; user personal locations 28; user time restrictions 30; weather location restrictions 32; high-risk locations 34; telephone number restrictions 36; and other restriction data which may be selected 38.

The cell control channel request from a cell phone unit comprises a request control packet of up to 53 bytes (octets) of data, which follows the following information field protocol, FIG. 3:
PES header
ISO header
Sender telephone number (cell phone)
Serial number of cell phone
Emergency priority request
GPS location
HFA bit
Call telephone number (call request This packet is graphically represented in FIG. 3, reading from left to right.

In ATM, the system is presented with each 53 byte packet in asynchronous fashion on a start-stop basis. This requires enhanced recognition software and limits simultaneous transmissions, for a given bandwidth and communications server capacity. SMDS is more suitable for LAN to LAN interconnection, and generally offers T-3 bandwidth (45 Mbps). In cell-switched service it offers excellent congestion control because each packet must have a header and trailer portion, which each contain network control information. Protocol data Units (PDU) are utilized.

The monitoring and control circuitry of the present invention, being software implemented, is resident in computer memory at the cell base station communications server 33. This software performs logical decision making shown in the logic flow diagram of FIG. 4. When a call request is received 63, it is determined if it is from a land line 65 (the alternative being from a cell phone). If the call request is from a cell phone, the cell phone request is read 67, and then the data is validated, step 69, by transmitting back to the cell phone to confirm the accurate receipt of the information. Once determined that the information was correctly received, the cell phone ESN is determined valid or not 71. If not valid, the transmission is disconnected and a disconnect message is transmitted to the sender 73.

If the serial number (ESN) is valid, it is determined if the request is for an emergency "911" call or other priority call such as a medical alert, step 75. If the call is a "911" or a medical alert, the cell phone GPS location already received is sent to emergency services 77, or respectively the medical alert message and GPS location is sent to its respective emergency service 76, with both calls being provided with a priority connection to the transmission channel (traffic channel) 79.

If there is no emergency call, the cell telephone number is then validated against the service provider's database. If it is not valid a disconnect message 73 is generated. If it is valid, the cell phone location from GPS data is checked against the roadway database to determine if the cell user is on-the-highway, step 83. If it is not, it is then checked against each of the other data bases of FIG. 2a in turn 78. It there is a "hit", i.e. valid comparison with any other database, (business location 26, user personal location 28, user time restriction 30, high risk location, telephone number for location restriction 34, or other location restriction 38), an inhibit message is generated 80 and the time and telephone number of the caller is sent to the subscriber's mail box 82. Once a first "hit" is made, the search through any remaining un-searched databases is discontinued.

If no comparisons are made in step 78, the call is connected to the transmission (traffic) channel, step 85.

If the cell unit is determined to be on-the-highway in step 83, the cell unit location is then checked a current database compiled from the U.S. Weather Bureau to determine severe weather conditions at the cell unit location, step 87. If severe conditions exist, an inhibit message is sent to the call requester and an appropriate weather warning is annunciated 89.

If no severe weather is determined at step 87, the HFA data is interrogated to determine if the cell unit is on hands-free operation, step 91. If not an inhibit message is sent 93. If there is a HFA indicator, the call is passed to the transmission (traffic) channel 85.

In step 65, if the call request is from the land line network, the cell phone telephone number is read and checked against ESN and other data in the service provider's database 95. A control transmission is then sent to the cell unit and it is determined if the cell unit is in service, step 97. If the cell unit is out of service, a disconnect message is generated to the requesting caller, step 99.

If the cell unit responds, the units control and identification data is confirmed against that resident in the cell unit memory, step 101. If the unit has a valid serial number, step 103, the fact that its telephone number (service state) is valid is also confirmed, step 105. If either the serial number (ESN) or the cell telephone number are invalid, the disconnect message 99 is generated. If they are both valid, the process passes onto step 83, GPS location determination against the highway database, as in the cell unit originated call previously discussed. Subsequent process steps are carried out.

It is understood that after a disconnect message or an inhibit message is generated, the cell phone is disconnected from service by the service provider.

A redundant or substitute on-the-highway detection system can include a 2 KHz to 100 KHz AM (amplitude) radio noise receiver 105, FIG. 5. In the presence of engine noise, a small logic circuit, such as an A/D converter, or a logic gate, provides an engine noise present bit to the main microprocessor 43. This processor 43, in turn transmits this bit, being indicative an on-the-highway status, to the protocol encoder/decoder 53. A further redundant detection system is a motion detector circuit which detects a change of GPS position at a rate faster than walking or jogging.

Figure 6:
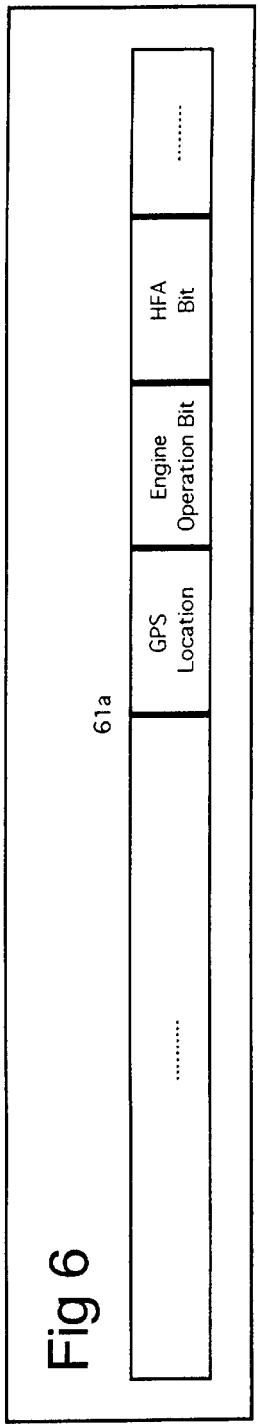
FIG. 6 shows a block presentation of header information in a cell phone request transmission.

This engine operation bit is placed in the control signal header information 61a, FIG. 6, behind the GPS location information and before the HFA bit. This control information is automatically transmitted to a cell station when a call request is processed.

Figure 7:
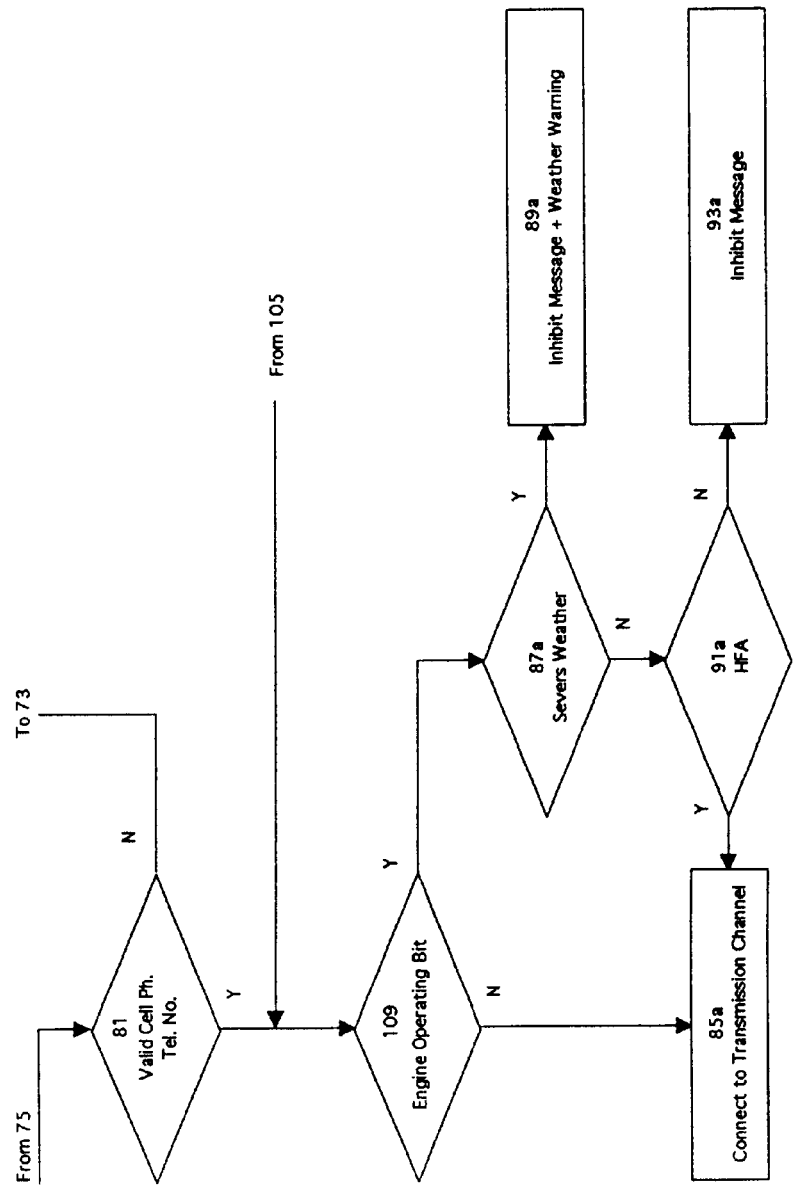
FIG. 7 is a logic flow diagram for the monitoring and control software modification to FIG. 4 where an engine operation bit present in the header.

The monitoring and control software resident at the communications server, is modified from that described in connection with FIG. 4, as shown in FIG. 7. Following the validation of the cell phone telephone number, step 81, the cell request control information is interrogated to determine if an engine operating bit is present, step 109. (Presence in this means that the bit has been changed from "0" to a logical "1".)

Figure 8:
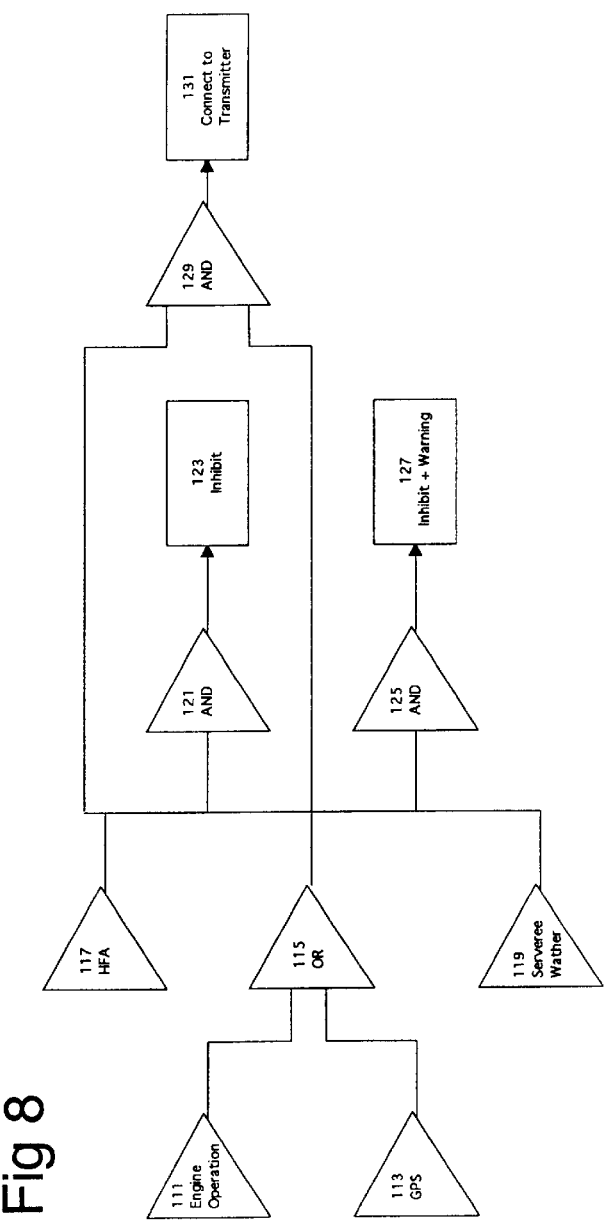
FIG. 8 is a circuit block diagram for logic circuitry carrying out engine operation and GPS decision making.

If there is no engine operation or motion, the call is connected to the transmission channel, step 85a. If there is an engine operating bit, then severe weather, step 87a, and HFA, step 91a, are interrogated as previously. An inhibit message and weather warning 89a, or an inhibit message 93a, or connection to a transmission channel, step 85a, results as previously.

Where the engine operation bit is used as an alternative to the GPS location, the logic of FIG. 7 is substituted for the relevant portion of the logic of FIG. 4. However, where the engine operation bit is used in parallel, i.e. redundant backup for the GPS determination, additional logic must be inserted in the connection to transmission channel step 85 or 85a. This logical decision is illustrated in FIG. 8. Specifically, where there is an indication from GPS or engine operation, but not both, that the cell unit is on-the-highway, the consensus is that the unit is on-the-highway.

Referring to FIG. 8, when the engine operation is present, the engine gate 111 has a logical "high" output. When the GPS location matches GPS highway data, the GPS gate 113 has a logical "high" output. These outputs are passed through an "OR" decision circuit 115 which produces a "high" output when either of the inputs is "high". When a HFA is sensed as present, the HFA gate 117 output is a "1". Further, when severe weather is detected at the cell phone GPS location, the severe weather gate 119 output is a "1".

The output from HFA gate 117 is input to an inverting input of a further "AND" decision logic circuit 121. The output from the OR circuit 115 is input to a non-inverting input terminal of the AND circuit 121. When the input from the OR circuit 115 is "high" and the input from the HFA gate 117 is "low", the output of AND circuit 121 is "high". A "1" output from the AND circuit 121 is connected to generate an inhibit signal and to refuse the transmission of the cell call 123.

The output of the OR circuit 115 is input to yet another AND decision circuit 125. A second input of this AND circuit 125 is connected to the output of the severe weather gate 119. In the presence of two "high" signals, the AND circuit 125 generates a "high" output. This logical "1" is connected to generate and inhibit signal, a weather warning and to refuse the transmission of the cell call 127.

A last AND circuit 129 is connected to the output of the OR circuit 115 and the HFA gate 117. In the presence of two "highs", this AND circuit 129 produces a "High" which causes the cell call to be connected to the transmission channel 131.

Many changes can be made in the above-described invention without departing from the intent and scope thereof. It is thereby intended that the above description be read in the illustrative sense and not in the limiting sense. Substitutions can be made in the depth and dimensions stated above and for the wear and other tolerances rendered thereby.

What is claimed is:

1. A monitoring and control system for cellular telephone transmission for inhibiting transmissions with a cell phone in a on-the-highway location, said cell phone communicating with a cell tower including a base station having a communications server, said cell phone having a main microprocessor, an operator touch pad connected to input to said main microprocessor, a protocol encoder/decoder circuit connected to said main processor, a modem connected to said protocol encoder/decoder circuit, and a transceiver connected to said modem, comprising:

a high definition GPS location receiver circuit connected to receive satellite GPS information through said cell phone antenna, and connected to said main processor for providing GPS location data of said cell phone to said main processor;

a hands-free adaptor (HFA) connected to input to said main processor, said input providing operation signals to said main processor;

a cell unit GPS location data line from said main processor to said protocol encoder/decoder circuit;

a HFA presence bit line from said main process to said protocol encoder/decoder circuit, said bit being "high" when said hands-free adaptor is connected and operational;

a transmission data line from said main processor to said protocol encoder/decoder circuit;

wherein said encoder/decoder formats the request for transmission call to a cell tower, said request including cell phone GPS location data and a HFA presence indicator bit; and detection software resident in the communications server for said cell tower being requested for transmission, said software interrogating said cell phone transmission request, including the reading of said cell phone GPS location information and said cell phone HFA bit information, said software inhibiting further transmission with said cell phone when said cell phone is at an on-the-highway location without HFA presence.

2. The monitoring and control system of claim 1 also including:
   an AM noise receiver connected to receive radio frequency noise generated by an operating engine through said cell phone antenna, and connected to said main processor for providing a noise presence bit to said main processor in the presence of engine operating noise; and
   an engine operation, on-the-highway indicator bit line from said main processor to said protocol encoder/decoder circuit.

3. The monitoring and control system of claim 2 wherein said AM noise receiver includes a 2 KHz–110 KHz noise receiver connected to receive radio frequency noise generated by an operating engine through said cell phone antenna, and connected to said main processor for providing a noise presence bit to said main processor in the presence of engine operating noise.

4. The monitoring and control system of claim 1 wherein said cell tower base station communications server is connected to receive weather bureau information of severe weather by GPS location, and wherein said cell phone transmission is denied when said cell phone is at a severe weather location.

5. The monitoring and control system of claim 4 wherein said detection software at said communications server performs the following steps:
   determining if a call request is from a land line;
   if not from a land line, reading the cell phone request information including emergency priority request ("911"), cell phone GPS location, HFA bit presence, engine noise bit presence;
   validating the request information;
   validating the cell phone EDN, and if not valid disconnecting;
   determining if a "911" emergency call, and if so, sending cell unit GPS location to emergency services and providing a priority connection to the transmission channel;
   validating cell phone telephone number, and if not valid disconnecting;
   determining if an engine operation, on-the-highway indicator bit is present, and if not then connecting the cell phone to a transmission channel;
   if an engine operation, on-the-highway indicator bit is present, then determining if there is sever weather at the cell phone GPS location, and if so rejecting the cell call request and disconnecting;
   if an engine operation, on-the-highway indicator bit is present, and there is determined no severe weather at the cell phone GPS location, then determining HFA presence and operation, if not then disconnecting; and
   when the engine operation, on-the-highway indicator bit is present, there is no severe weather at the cell phone GPS location, and the HFA bit is present, then connecting the cell phone to a transmission channel.

6. The monitoring and control system of claim 1 wherein said detection software at said communications server performs the following steps:
   determining if a call request if from a land line;
   if not from a land line, reading the cell phone request information including emergency priority request ("911"), cell phone GPS location, HFA bit presence, engine noise bit presence;
   validating the request information;
   validating the cell phone EDN, and if not valid disconnecting;
   determining if a "911" emergency call, and if so, sending cell unit GPS location to emergency services and providing a priority connection to the transmission channel;
   validating cell phone telephone number, and if not valid disconnecting;
   comparing cell phone GPS location with highway GPS database to determine if cell phone on-the-highway, and if not then connecting the cell phone to a transmission channel;
   if the cell phone GPS location is on-the-highway, then determining if there is severe weather at that GPS location, and if so rejecting the cell call request and disconnecting;
   if the cell phone GPS location is on-the-highway, and there is determined no severe weather at that GPS location, then determining HFA prsence and operation, if not then disconnecting; and
   when the cell phone GPS location is on-the-highway, there is no severe weather at that GPS location, and the HFA bit is present, then connecting the cell phone to a transmission channel.

7. A method of inhibiting transmissions with a cell phone in a prohibited situation in an existing cellular telephone transmission system, where each cell phone has GPS position signal reception and high definition location calculation, with a programmed monitoring and control circuit interposed before a base station communications server to interrupt cell phone transmissions to or from said base station communications server, comprising the steps of:
   placing said cell phone GPS location in the transmission request header format of said cell phone transmission;
   storing data of prohibited situations for said cell phone transmission;
   intercepting each transmission request to and from said cell phone and comparing said cell phone header to said stored prohibited situation data; and
   inhibiting transmission between said cell phone and said cellular telephone transmission system if said prohibited situation data is matched
   also including after the step of inhibiting transmission the steps of:
   establishing a mail box for said cell phone;
   placing the time and telephone number of said cell phone for which transmission was inhibited in said mail box; and
   sending an inhibit message to said cell phone for which transmission was inhibited
   also including after the step of intercepting each transmission request the steps of:
   determining if said transmission request is from a cell phone and if said transmission request is an emergency call; and
   permitting said call to go through without inhibiting transmission if it is an emergency call;
   wherein said storing data of prohibited situations step includes storing GPS location data of on the highway locations; and wherein said comparing step includes comparing said cell phone header GPS location information to said stored GPS location data of on the highway locations.

8. The method of claim 7 wherein said storing data of prohibited situations step further also includes establishing plural stored databases of separate GPS location data of any of restricted transmission business locations, restricted transmission high risk area locations, cell user elected locations, and cell user elected time restrictions; and wherein said comparing step includes comparing said cell phone header information to said plural database data.

* * * * *

UNITED STATES PATENT AND TRADEMARK OFFICE
CERTIFICATE OF CORRECTION

PATENT NO. : 6,799,052 B2
DATED : September 28, 2004
INVENTOR(S) : Agness et al.

It is certified that error appears in the above-identified patent and that said Letters Patent is hereby corrected as shown below:

Column 10,
Line 31, replace "in a on-the-highway location" with -- in a on-the-highway location --;
Line 49, replace "process" with -- processor --;

Column 11,
Line 62, replace "request if from" with -- request is from --;

Column 12,
Line 10, replace "phone on-the-highway" with -- phone is on-the-highway --;
Line 61, replace "on the highway" with -- on-the-highway --;
Lines 64-65, replace "on the highway" with -- on-the-highway --.

Signed and Sealed this

Twenty-eighth Day of June, 2005

JON W. DUDAS
*Director of the United States Patent and Trademark Office*